(12) United States Patent
Laing (10) Patent No.: US 6,897,596 B2
(45) Date of Patent: May 24, 2005

(54) ELECTRIC MOTOR

(75) Inventor: Karsten A. Laing, Althuette (DE)

(73) Assignees: Oliver Laing (DE); Karsten Laing (DE); Birger Laing (DE)

( * ) Notice: Subject to any disclaimer, the term of this patent is extended or adjusted under 35 U.S.C. 154(b) by 0 days.

(21) Appl. No.: 10/648,846

(22) Filed: Aug. 25, 2003

(65) Prior Publication Data

US 2004/0119371 A1 Jun. 24, 2004

(30) Foreign Application Priority Data

Oct. 30, 2002 (DE) .......................... 102 51 647

(51) Int. Cl.[7] .............................................. H02K 1/12
(52) U.S. Cl. .......................... 310/254; 310/90; 310/216
(58) Field of Search .......................... 310/90, 216–218, 310/254, 261

(56) References Cited

U.S. PATENT DOCUMENTS

| | | | | |
|---|---|---|---|---|
| 3,732,445 A | * | 5/1973 | Laing | 310/90 |
| 3,741,690 A | * | 6/1973 | Laing | 417/420 |
| 4,051,401 A | * | 9/1977 | Hayward | 310/216 |
| 4,297,604 A | * | 10/1981 | Tawse | 310/168 |
| 4,352,646 A | * | 10/1982 | Laing et al. | 417/420 |
| 4,471,253 A | | 9/1984 | Laing | |
| 4,580,335 A | | 4/1986 | Laing et al. | |
| 4,614,887 A | * | 9/1986 | Ahner et al. | 310/166 |
| 4,661,737 A | * | 4/1987 | Barri | 310/166 |

FOREIGN PATENT DOCUMENTS

| | | |
|---|---|---|
| DE | 1 538 717 | 6/1970 |
| DE | 15 38 715 B | 9/1972 |
| DE | 33 02 349 A1 | 7/1984 |
| DE | 34 36 511 A | 4/1986 |
| DE | 34 36 511 A1 | 4/1986 |
| EP | 0 064 846 A | 11/1982 |
| GB | 1 207 621 | 9/1967 |

OTHER PUBLICATIONS

European Search Report dated Sep. 27, 2004 for European Patent Application No. 03021154.4–1528.

* cited by examiner

*Primary Examiner*—Thanh Lam
(74) *Attorney, Agent, or Firm*—Foley & Lardner LLP (57) ABSTRACT

An electric motor comprising a rotor and a stator is disclosed. The rotor is supported on a substantially spherical bearing and is of a substantially spherical design facing the stator, which has a high degree of efficiency. The stator may have a magnetic return-path body which is made of a compressed powder material. The return-path body may be of a substantially spherical design, at least in segments facing the rotor.

39 Claims, 6 Drawing Sheets

ELECTRIC MOTOR

RELATED APPLICATION

The present disclosure relates to the subject matter disclosed in German patent application No. 102 51 647.2 of Oct. 30, 2002, which is incorporated herein by reference in its entirety and for all purposes.

FIELD OF THE INVENTION

The invention relates to an electric motor comprising a rotor and a stator. In particular, the invention relates to motors wherein the rotor may be supported on a substantially spherical bearing and is of a substantially spherical design facing the stator.

Electric motors of this type are used, in particular, in the case of centrifugal pumps. They have the advantage that mounting of the rotor free of play may be achieved. Such electric motors are described, for example, in DE 33 02 349 A1 or DE 15 38 717.

SUMMARY OF THE INVENTION

In accordance with embodiments of the present invention, an electric motor which has a high degree of efficiency is provided.

This is accomplished in accordance with certain embodiments of the invention in that the stator has a magnetic return-path body which is made of a compressed powder material and that the return-path body is of a substantially spherical design facing the rotor, at least in segments facing the rotor.

The production of the return-path body from a compressed powder material results in a high variability with respect to the shaping for the return-path body. This can be optimized as a result in order to ensure a high transfer of magnetic flux to the rotor with minimal losses. A three-dimensional, optimized shaping may, in particular, be achieved.

In the case of known powder materials, such as SOMALOY of the company Höganäs AB, Sweden (SOMALOY is a registered trademark), iron granules and, in particular, soft-magnetic iron granules are insulated electrically in relation to one another. Only slight eddy-current losses then occur in a return-path body while the required magnetic properties are present. Simultaneously with the optimal, functional properties (large magnetic conductivity, small electric conductivity), an optimal geometric shape of the return-path body may also be produced.

When the return-path body is of a substantially spherical design, for example, at least in segments facing the rotor, a spheroid motor may be realized with a small air gap which is, in particular, essentially in the shape of a substantially spherical shell. In the case of a small air gap, the magnetic transfer from the stator to the rotor can be optimal.

The coupling of the magnetic field into the return-path body by way of coils on the return-path body can also be optimized via the manufacture of the return-path body by a compressed powder material. It is possible for that part of the return-path body which is located in the area of the part of the coil generating the magnetic field to have a cross section which is sufficient (and, in particular, just sufficient) to transport magnetic flux without oversaturation, while the area transferring magnetic flux to the rotor may have a large surface. Altogether, a high degree of efficiency may be achieved as a result, and the material required for windings can be minimized.

It is desirable that the return-path body be a compact body or have compact return-path body elements. The return-path body can, in this respect, be in one part and, in particular, in one piece or be composed of several parts. As a result, a simple assembly may be realized. In addition, an optimal coupling-in of the magnetic field can result.

In one embodiment, the return-path body is composed, of a plurality of return-path body elements, wherein these can be separate elements or elements interconnected in one piece. The return-path body elements may be optimized in order to achieve a high degree of efficiency for the electric motor.

A return-path body may be manufactured in the case of separate return-path body elements in that adjacent return-path body elements may be connected via a plug connection. A return-path body may then be manufactured in a simple and quick manner, wherein coil-receiving portions of different types may be manufactured depending on the use.

One embodiment of the return-path body comprises, a plurality of segments, each segment having a substantially spherical surface facing the rotor. For example, the envelope of the surface may be part of a spherical surface. Such a return-path body may be produced in a simple manner and optimized with respect to its shaping such that a high degree of electrical efficiency is achieved with a minimized use of material with respect to coil windings. A segment can, in this respect, be formed in one piece on a return-path body or be formed on a return-path body element, wherein several return-path body elements then form the return-path body.

In a variation of one embodiment, adjacent segments are separated magnetically in that a gap may be formed between such adjacent elements. In this way, a multipolar stator arrangement can be realized. In other embodiments, it may be provided for the return-path body to have a complete spherical surface, wherein the magnetic separation is then brought about via electric separation of adjacent coils.

It is then provided, in particular, for segments to be connected to one another via a return-path area, wherein the return-path area can connect adjacent segments to one another or can connect oppositely located segments to one another in order to provide the magnetic return path in this way.

In particular, the return-path body surrounds the rotor in a ring shape, wherein the return-path body can have a complete surface or a plurality of substantially spherical surfaces with a substantially spherical envelope, depending on the use.

It may be desirable that the powder material comprises iron granules and, in particular, soft iron granules which are insulated electrically relative to one another. Such a powder material is available under the name SOMALOY™ from the Höganäs company, Sweden. While the magnetic properties are optimized, eddy current losses in the electric motor can be minimized so a high degree of efficiency can be achieved.

It is particularly advantageous when the return-path body has at least one coil receiving portion in order to accommodate windings for the stator.

It is then intended for the coil receiving portions to be provided with an electric insulation and/or for an accommodated coil to be provided with an electric insulation towards the coil receiving portions. The electric insulation may be made, for example, by means of an insulating layer on the coil receiving portions or with a sheathing of the accommodated coil. The electric insulation can also be formed by a corresponding insulating sleeve which is seated on the coil receiving portions, wherein the coil is then seated on the insulating sleeve.

It is particularly favorable when the at least one coil receiving portion is arranged and designed such that accommodated coils do not project beyond the spherical area of the return-path body in the direction of the rotor. As a result, the width of the air gap between the rotor and the return-path body can be optimized so that an optimum transfer of magnetic flux to the rotor is ensured. In the case of a circulation pump, for example, with which an electric motor in accordance with an embodiment of the invention is used, the air gap can then be dimensioned such that no significant frictional braking occurs.

In this respect, an air gap which is formed between the rotor and the spherical area of the return-path body can be, in particular, free from coils and so the spherical surface of the stator is determined solely by the return-path body and not by coils seated on the return-path body.

Coil receiving portions can be formed in a simple manner from the point of view of production engineering when the return-path body has a plurality of recesses as coil receiving portions or for the formation of coil receiving portions. Coils may then be inserted into such recesses or they may be wound into such recesses.

In this respect, a recess which has an area facing the rotor is favorably set back in relation to the spherical surface of the return-path body. As a result, an area is made available which can accommodate a coil at least partially without the coil itself projecting beyond the spherical surface area of the return-path body.

It may be provided for a coil to be wound onto a coil receiving portion, in particular, when the return-path body is designed in one piece.

It may, however, also be provided for a prefabricated coil to be pushed onto or placed on a coil receiving portion. This is possible, in particular, when the return-path body is composed of separate return-path body elements.

In addition, it is particularly favorable when a coil receiving portion is dimensioned such that the part of the return-path body which is located in the area of the generated magnetic field of the accommodated coil is considerably smaller than the area of the return-path body which transfers the generated magnetic field to the rotor. As a result, the magnetic losses in the return-path body may be minimized and the transfer of magnetic flux to the rotor optimized. Altogether, a high degree of electric efficiency can be achieved as a result for the electric motor in accordance with the invention.

It is particularly favorable when the coil receiving portion is dimensioned such that an adequate area of the return-path body is made available in order to transport magnetic flux below the saturation level. As a result, magnetic losses can be kept low and, therefore, the degree of electric efficiency is maximized. On the other hand, it is possible via the spherical surface or spherical surfaces of the return-path body for magnetic flux to be transportable to the rotor over a maximum surface area. An optimum ratio of the surface areas with respect to the transition of air of the return-path body and the transition of the magnetic field to the coil receiving portion may then be made available. In the case of an AC motor, the ratio of the corresponding surface areas is, for example, approximately 2.5:1 with a compressed powder return-path body consisting of SOMALOY. (This ratio is dependent on the material.)

A coil receiving portion is favorably designed such that a coil with a round or approximately round cross section can be accommodated. In the case of a round cross section, the winding portion of the coil (with a predetermined cross section) is minimized. As a result of the inventive solution, coil geometries can be used, with which the ratio between the transverse diameters is closer to one. (In the ideal case, with a coil with a round cross section, the ratio is at one.)

Depending on the number of poles, the return-path body preferably has a plurality of spaced recesses as coil receiving portions which are set back in relation to the spherical surface.

In this respect, the recesses are, in particular, distributed uniformly around an inner circumference of the return-path body in order to make symmetric ratios available in this way.

In one embodiment, a coil axis of a coil seated in the coil receiving portion lies substantially in circumferential direction of the return-path body, wherein the coil axis may be straight so that the coil axis is seated substantially parallel to the tangential direction. The coil axis can also be curved and, in particular, correspond to a circumferential section of a circle.

In an alternative embodiment, a coil axis of a coil seated in the coil receiving portion is aligned substantially radially.

When the return-path body has recesses which face the rotor, the return-path body may be designed with a small axial height and the vertical dimensions of the electric motor may be kept small. The transverse dimensions may likewise be kept small. It may, however, also be provided for the at least one coil receiving portion to be arranged behind or beneath the spherical surface area of the return-path body facing the rotor in order to, for example, make a complete spherical surface available.

It may also be provided for the return-path body to have a connecting area which is located transversely to an axis of rotation of the rotor and makes a transverse magnetic connection available in order to optimize the return path in this way.

This connecting area can also be used for forming the at least one coil receiving portion.

The design of the return-path body in accordance with the invention may be realized with a large number of rotor configurations. In the case of the rotor, this may, for example, be a cage rotor, a rotor generating a magnetic field (synchronous rotor) or a hysteresis rotor. In the case of the electric motor itself, this may be an AC electric motor or a DC electric motor.

In one embodiment, several coils are arranged on the return-path body as torus-shaped coils. These follow the contour of the return-path body in order to project as little as possible into the air gap and to obtain an air gap with a minimum width in the case of a spherical surface of the return-path body. With this embodiment, some of the windings of the coil may be arranged in the air gap, wherein this portion is, however, minimal.

As a result of the fact that the coils are of a torus-shaped design and, in particular, also follow the contour of the return-path body at its side facing the rotor, a minimized portion of the surface area of the coils is arranged in the air gap. With this embodiment, the return-path body, which can, in particular, be designed in one piece, forms as a whole a coil receiving portion for a plurality of coils. Adjacent coils are separated electrically from one another. The number of coils is related to the number of poles.

A winding axis may be substantially parallel to a circumferential direction of the return-path body and may coincide with it. The winding axis is, in this respect, curved.

The invention relates, in addition, to a circulation pump which is provided with an electric motor.

This circulation pump has the advantages already explained in conjunction with the electric motor.

In this respect, a partition wall is, in particular, arranged in an air gap between rotor and return-path body. This partition wall separates the wet area from the return-path body. The width of the air gap may be adjusted by means of the inventive return-path body such that the air gap can still be selected, even with a partition wall, to be of such a width that minimal frictional braking occurs but a high transport of magnetic flux towards the rotor is ensured.

The following description of preferred embodiments serves to explain the invention in greater detail in conjunction with the drawings.

DETAILED DESCRIPTION OF THE INVENTION

Figure 1:
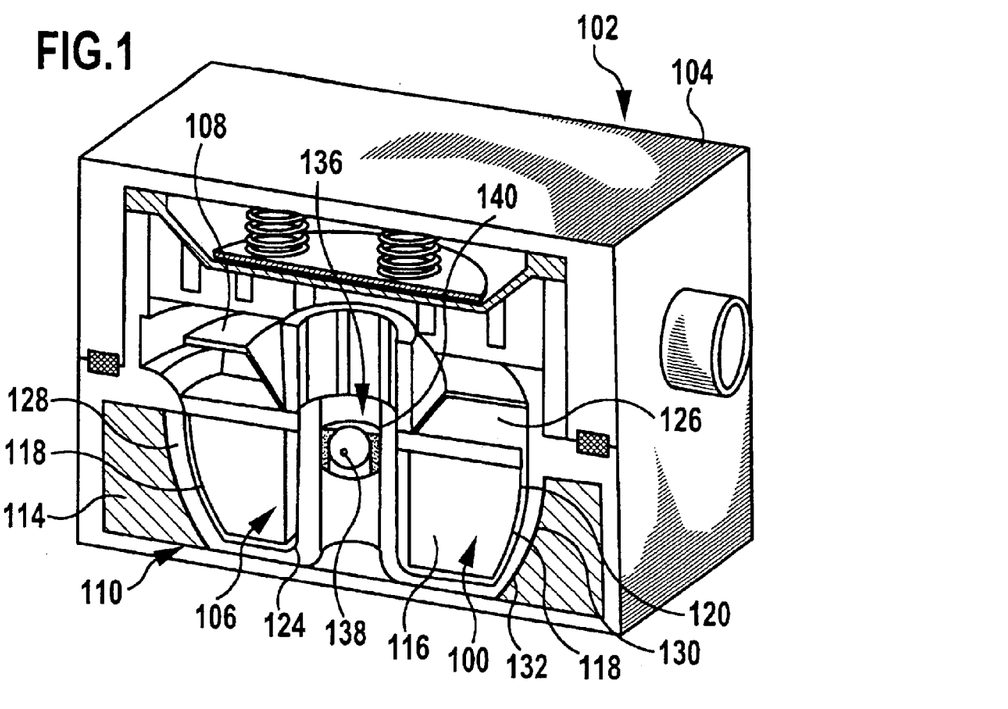
FIG. 1 shows a perspective sectional view of one embodiment of a circulation pump in accordance with the invention.

One embodiment of an inventive electric motor which is designated in FIG. 1 as a whole by reference numeral 100 is part of a circulation pump 102 so that a pump-motor unit is formed. The circulation pump 102 comprises a housing 104, in which the electric motor 100 is arranged. The circulation pump 102 is, as described in greater detail below, designed as a centrifugal pump.

The electric motor 100 has a rotor 106. An impeller 108 is non-rotatably connected to the rotor 106 in order to form a rotor-impeller unit.

The electric motor 100 comprises, in addition, a stator 110 with one or more windings and a return-path body 114, for example, in the form of a soft magnetic return-path ring in one piece or several pieces. Embodiments according to the invention of return-path bodies are described in detail below. The stator 110 is arranged non-rotatably in the housing 104.

The rotor 106 is designed in one embodiment so as to generate a magnetic field. For this purpose, it comprises one or more magnetic elements 116, which are, in particular, permanent magnets which are magnetized in a radial direction. The magnetic elements 116 may be formed via permanent magnets of a high coercive field strength, wherein the magnetic poles of the individual magnetic elements are arranged over the circumference of the rotor 106 with alternating poles.

A surface 118 of the rotor 106 facing the stator 110 is part of a substantially spherical surface, wherein the magnetic elements 116 follow this surface configuration. In order to protect the magnetic elements 116, the rotor 106 has a casing 120 which may be produced from plastic or high-grade steel which forms the surface 118.

The spherical surface 118 corresponds to a section of an imaginary sphere which has been cut at right angles to an axis 122 (FIG. 2) which extends through the center point of the imaginary sphere. An area 124 of the rotor 106 facing the housing 104 has, as a result, an essentially flat surface. The same applies for an area 126 of the rotor 106 which points towards the impeller 108.

An air gap 128 for the magnetic return path is formed between the rotor 106 and the stator 110 and, in particular, its return-path body 114. A wall 132 arranged in the air gap 128 acts as a partition wall to the wet area of the circulation pump 102 in order to protect the return-path body 114 with the windings.

Figure 2:
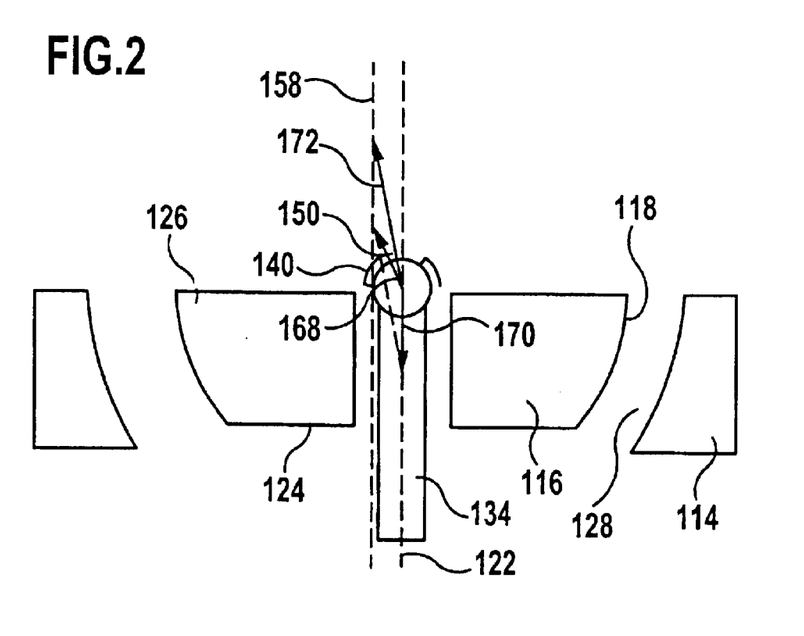
FIG. 2 shows schematically a partial view of a rotor and a stator and the effective forces.

The rotor 106 is mounted spherically in order to form a centrifugal pump. A corresponding bearing 136 comprises a sliding member 138 which is designed as a sphere and is seated on a support column 134 (FIG. 2). This support column is arranged so as to be non-rotatable in the housing 104. The center point of the sliding member 138 is seated substantially on the axis 122 of the rotor. Furthermore, the center point of the sliding member 138 coincides substantially with the center point of the imaginary sphere which forms the surface 118.

The bearing 136 comprises, in addition, a bearing cap 140 (FIG. 3) which is produced, for example, from carbon. The sliding member 138, which may be produced from a hard material and, in particular, a ceramic material, can slide in the bearing cap 140 relative to the bearing cap 140. The bearing cap 140 is connected non-rotatably to the rotor 106. As a result, to a great extent, mounting of the rotor 106 in the housing 104 free of play can be realized.

Figure 3:
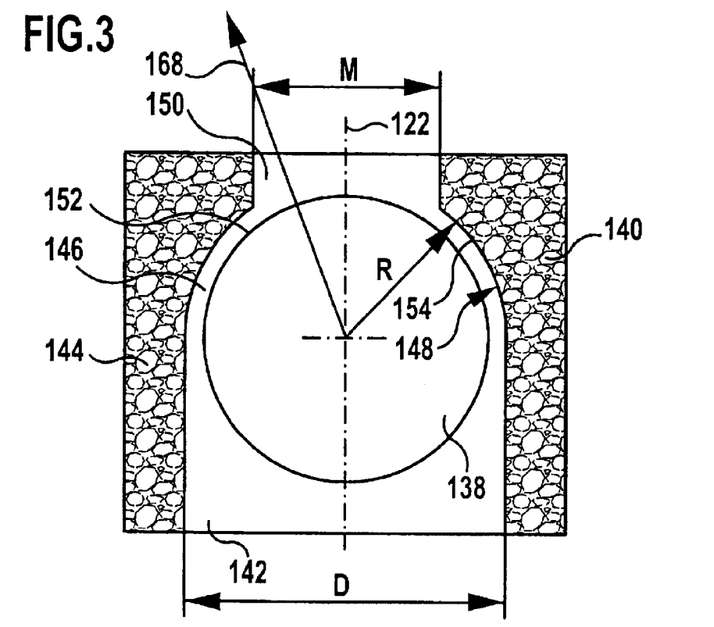
FIG. 3 shows a partial sectional view of one embodiment of a bearing for mounting the rotor.

The bearing cap 140 comprises, as shown in FIG. 3, a hollow cylindrical section 142 with a diameter D which corresponds essentially to a spherical diameter d of the sliding member 138. An air gap 146 is formed between the sphere 138 and a bearing cap wall 144, the extension of this air gap transversely to the axis 122 being considerably smaller than the diameter d of the sliding member 138.

A spherical section 148 follows the hollow cylindrical section 142 in axial direction (in the direction of the axis 122), wherein the center point of the imaginary sphere forming this spherical section coincides with the center point of the sliding member 138 which is a sliding sphere for the bearing 136. The radius R of this imaginary sphere, which forms the spherical section 148, corresponds to the radius d/2 of the sphere of the sliding member 138.

A central, material-free area 150 is formed in the bearing cap 140 about the axis 122 of the rotor 106. This area is, therefore, arranged in the spherical section 148 and is connected via the spherical section 148 to the hollow cylindrical section 142. This central, material-free area 150 is of a symmetric design in relation to the axis 122 and has a diameter M.

The central, material-free area 150 forms a lubricating bore, via which a lubricating medium, such as a liquid being conveyed, may be supplied to a sliding surface 152 of the sliding member 138 and to a sliding surface 154 of the bearing cap 140, in particular, at the spherical section 148.

The sliding member 138, which is seated on the support column 134, dips into the hollow cylindrical section 142 of the bearing cap 140 and can slide over the spherical section 148 relative to the bearing cap 140. Axial and radial forces of the rotor 106 may be transferred to the sliding member 138 via the spherical section 148. The sliding member 138 accordingly exerts a counterforce on the rotor 106 and, therefore, on the bearing cap 140.

In one embodiment of the electric motor, the rotor 106 generates a magnetic field via the magnetic elements 116, i.e., the magnetic field proceeds from the rotor 106. In the air gap 128, lines of forces extend between the rotor 106 and the soft magnetic return-path body 114 of the stator 110. In this respect, they do not, however, extend parallel but rather have a relatively large curvature. As a consequence, large differences in radial force occur when the rotor 106 becomes displaced off-center with respect to the stator 110. For example, when an axis 158 of the stator 110 and the axis 122 of the rotor 106 no longer coincide, one magnetic pole of the magnet 116, which is located closer to the return-path body 114 on account of the eccentricity, experiences a greater radial force than the magnetic pole which is located diametrically opposite and has a greater distance to the return-path body 114. During the movement out of a central position, the radial force increases in the case of the magnetic pole moving closer to the return-path body 114 whereas it decreases in the case of a magnetic pole located diametrically opposite. As a result, problems with stability can occur with respect to the mounting.

Apart from or instead of an asymmetry between rotor 106 and stator 110 on account of relative, off-center positions, asymmetries in the magnetization or non-symmetric formations of air-gap boundaries can lead to a resulting magnetic force which has a radial component.

The central, material-free area 150 sees to it that the problems and, in particular, problems of wear and tear on account of asymmetry, such as, for example, eccentricity between the rotor 106 and the stator 110, are avoided to a great extent.

The rotor 106 experiences a force which is composed of the hydraulic force and the resulting magnetic force. It acts with a resulting force on the sliding member 138, the resulting counterforce 168 of which (FIG. 4) is exerted by the sliding member 138 on the bearing cap 140. The resulting counterforce 168 is the result of the hydraulic counterforce 170 and the resulting magnetic counterforce 172. When the rotor 106 is arranged centrally, i.e., its axis 122 coincides with the axis 158 of the stator 110, the radial component of the resulting magnetic counterforce 172 is zero in the case of isotropic magnetization and the resulting counterforce 168 acts in the axial direction of the axis 122.

If, however, the rotor 106 is non-symmetric in relation to the stator 110, for example, in that a parallel axial offset between the axes 122 and 158 is present, as shown in FIG. 2, the divergent lines of force lead in the case of a rotor 106 generating a magnetic field to the fact that a difference in radial force is present. Since, in addition, the axial portion of the resulting magnetic counterforce 172 is relatively small when the rotor 106 with its magnetic elements 166 has a low constructional height in the axis 122, this means that the resulting counterforce 168, as shown in FIG. 3, is no longer located in the same direction as the hydraulic counterforce 170, i.e., on the axis 122 but rather at an angle thereto.

This would, however, mean that in the case of asymmetry between rotor 106 and stator 110 the sliding member 138 presses off-center on the bearing cap 140 and the bearing cap 140 experiences a corresponding wear and tear as a result. The corresponding area of wear and tear on the bearing cap 140 is, however, not spherically symmetric. Rather, an annular channel would be formed in it which, leads to the bearing cap 140 taking up a one-sided rolling movement during rotation about the sliding member 138, instead of sliding on the spherical surface of the sliding member 138 over its entire surface. This leads to an imbalance, to increased noise formation and to ever-increasing non-spherical wear and tear.

The central, material-free area 150 is arranged and designed such that the resulting counterforce 168 impinges on a material-free area, e.g., on a cutaway area. This is so large that the force vector 168 impinges on liquid but not on any solid material of the bearing cap 140. As a result, no non-spherical wear and tear of the bearing cap 140 can result even with angled force vectors 168 and so, to a great extent, the mounting of the rotor 106 in the housing 104 free of play is ensured over a longer period of time.

The return-path body 114 in accordance with embodiments of the invention is produced from a compressed powder material with soft magnetic properties. As a result, a plurality of design possibilities results for the return-path body 114 in order to optimize the operation of the electric motor 100 and, in particular, of the circulation pump 102 depending on the application.

Suitable powder materials for the production of the return-path body 114 are, for example, metal powders of the company Höganäs AB, Sweden, known under the trade name SOMALOY 500 (SOMALOY is a registered trademark of the company Höganäs AB). This powder material has soft magnetic iron granules which are insulated electrically from one another. As a result, the desired soft magnetic properties result for the return-path body 114, while eddy-current losses are minimized.

The return-path body 114 is of a compact design or has compact individual elements which are connected to one another. As a result, an optimized absorption of the magnetic field and transfer to the rotor 106 may be achieved. The return-path body 114 may be designed as one part and, in particular, one piece or also be designed in several parts.

The return-path body 114 is thereby of a substantially spherical design facing the rotor 106, having a substantially spherical surface area 202 at least in segments (FIG. 4) which faces the spherical surface area 118 of the rotor 106. The corresponding spheres which are envelopes of these surface areas 118 and 202 are located substantially concentrically (i.e., their respective center points coincide).

Figure 4:
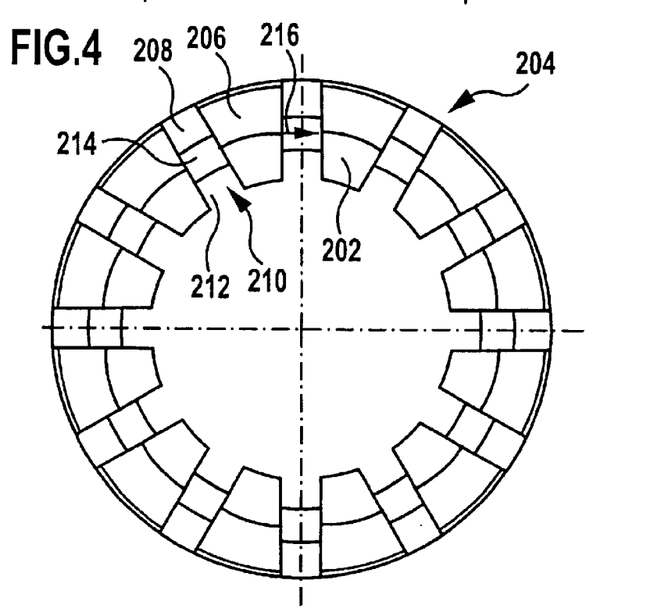
FIG. 4 shows a plan view of a first embodiment of a return-path body in accordance with the invention.
Figures 5, 6:
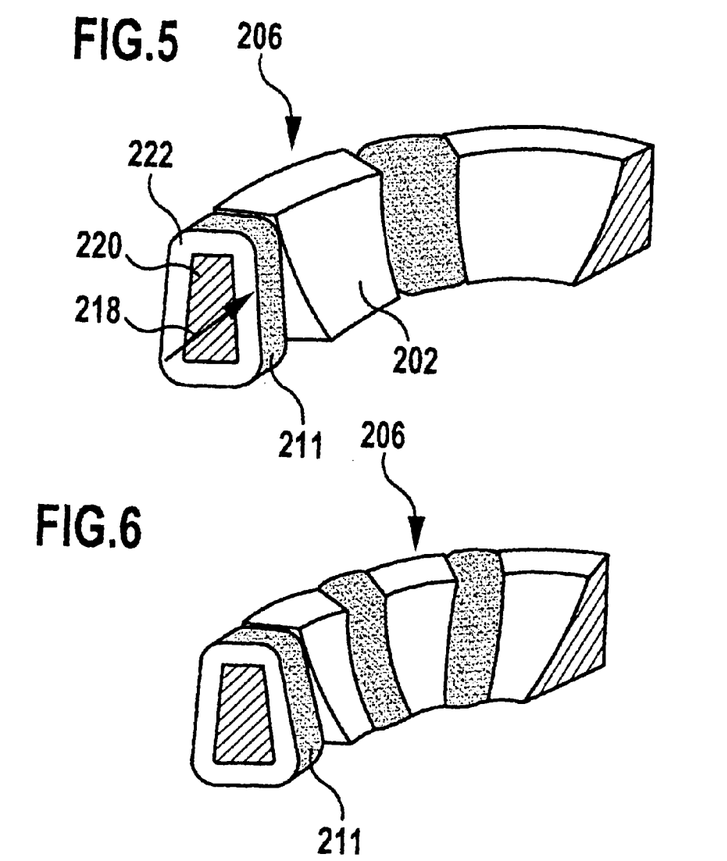
FIG. 5 shows a perspective partial view of the return-path body according to FIG. 4 with accommodated windings.
FIG. 6 shows a variation of the embodiment according to FIG. 5.

In a first embodiment of an inventive return-path body which is shown in FIGS. 4 to 6 and designated therein as a whole as 204, this return-path body 204 is designed in one piece as a ring which comprises a plurality of segments 206 which each have a substantially spherical surface area 202 facing the rotor 106.

A respective winding receiving means or coil receiving portion (coil receiving means) 208 is formed between adjacent segments 206 in order to accommodate a respective coil 211 with a plurality of windings (FIGS. 5, 6).

The respective coil receiving portions 208 are formed by recesses 210 which are set back in relation to the spherical surface area 202. Recess 210, therefore, has an area 212 which is set deeper in relation to the spherical surface area 202 of the adjacent segments 206.

In the illustrated embodiment, a coil receiving portion 208 has a support element 214, onto which the respective coil 211 can be wound or placed. The support element 214 is provided with an electric insulation, such as, for example, a plastic layer or a plastic attachment, on which the coil 211 is then seated.

The coil receiving portion 208 with the recess 210 is dimensioned such that when a coil 211 is accommodated and, in particular, when a coil 211 is wound onto the support element 214, the coil does not project beyond a spherical surface area which is formed by the enveloping surface area of all the spherical surface areas 202 of the segments 206. As a result, the coils 211 of the return-path body 204 do not project into the air gap 128 between the rotor 106 and the return-path body 204. The air gap 128 is, therefore, free from any windings.

As a result, an optimized high filling ratio may be achieved in combination with the spherical geometry of rotor 106 and return-path body 114 since the return-path body 114 may be arranged very close to the rotor 106 at least in parts (with its spherical surface area). The rotor 106 is then acted upon with magnetic flux via the return-path body 114 over a large surface area. In this way, very high degrees of electric efficiency may be realized since a considerable transport of magnetic flux through the air gap 128 is ensured.

The wall 132, which should be resistant to pressure and be chemically resistant, is arranged in the air gap 128. The air gap 128 is designed such that the gap in the shape of a spherical shell between the partition wall 132 and the rotor 106 is sufficiently wide that frictional effects do not significantly brake the rotation of the rotor 106. An optimization between friction minimization (large air gap 128) and field action on the rotor 106 (small air gap 128) may be achieved due to the embodiments of the return-path body 114.

In the case of the illustrated embodiment of the return-path body 204, the support elements 214 are oriented in circumferential direction 216 of a circle. A coil axis 218 (FIG. 5), which represents a winding axis, is, in the case of this embodiment, oriented substantially parallel to this circumferential direction 216. The coil 211 then surrounds the support element 214, wherein it is in contact with this at an intermediate insulation layer or is itself provided with an insulation. The contact area with the support element 214 is an inner area 220 of the respective coil 211, wherein the essential portion of the magnetic field of the coil 211 is generated in this inner area 220.

Furthermore, the respective coil 211 has a contact area 222 with the return-path body 204, in which the respective ends of the coils abut on the limiting walls of the recesses 210 of the segments 206, wherein an intermediate insulation layer is provided.

As a result of such a design it is possible for the return-path body 204 to have (via the support element 214), in the area in which the essential part of the magnetic field is generated, a minimized cross section which is sufficient to transport a magnetic flux below the saturation level of the material of the return-path body, while the area transferring magnetic flux (e.g., the sum of the spherical surface areas 202 of the segments 206) has a large surface area in order to transport the magnetic flux through the air gap 128 substantially free from losses.

In this way, the winding portion in the stator 110 can be minimized and, in particular, the coils 211 may be adapted to be closer to an optimized round shape. As a result, the material required for the coils 211 is minimized. Furthermore, a high degree of electric efficiency may be achieved for the electric motor.

In one variation which is shown in FIG. 6, the number of segments 206 is increased in comparison with the embodiment according to FIG. 5 in order to form an electric motor with higher number of poles.

It is provided, in particular, in the case of a return-path body 204 in one piece for the coils 211 to be wound directly onto the support elements 214 of the respective coil receiving portion 208 with an intermediate insulation layer.

It may, also be provided for the coils to be prefabricated and then pushed onto the support elements. The coils then have a respective insulation and/or the support elements are provided with the insulation. In this case, the return-path body is designed in several pieces and comprises, as shown by way of example in FIG. 18, a plurality of return-path body elements 224 which can be combined to form an annular return-path body. These return-path body elements 224 are, in particular, designed such that they can be plugged into one another.

Figures 18, 19:
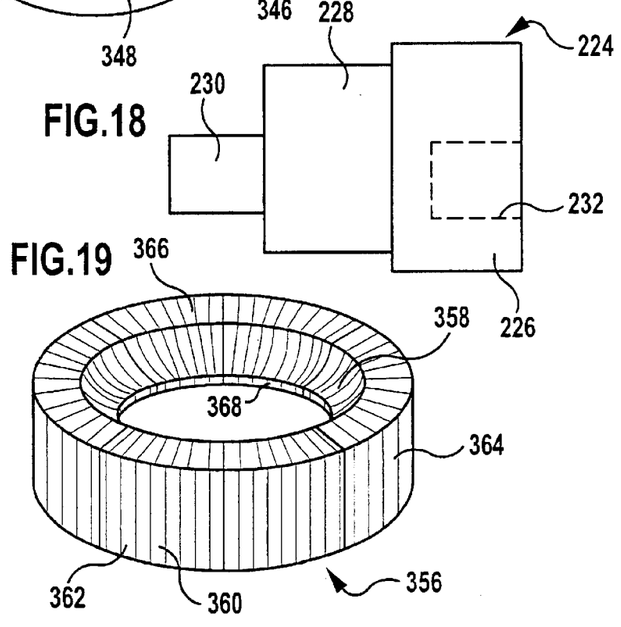
FIG. 18 shows a schematic side view of one embodiment of a return-path body element.
FIG. 19 shows an embodiment of a toroidal winding on a return-path body.

For this purpose, such a return-path body element 224 comprises a first area 226 which is provided with the spherical surface which is positioned so as to face the rotor 106. The first area 226 is provided with a prior receiving recess 232 opening to one side. A second area 228 follows the first area and forms the coil receiving portion and, as a result, is set back in comparison with the first area 226 at least in relation to its spherical surface. This second area 228 forms, in particular, the support element for the associated coil.

A pin element 230, which can be pushed into a recess 232 of an adjacent return-path body element, is seated on the second area.

A return-path body ring may be plugged together accordingly with a plurality of such return-path body elements 224. The coils, prefabricated prior to being plugged together, can be pushed onto the second area 228. Otherwise, the return-path body formed with return-path body elements 224 functions as described above. The individual segments with a spherical surface can be formed on the return-path body elements or also be formed via adjacent elements.

Figure 7:
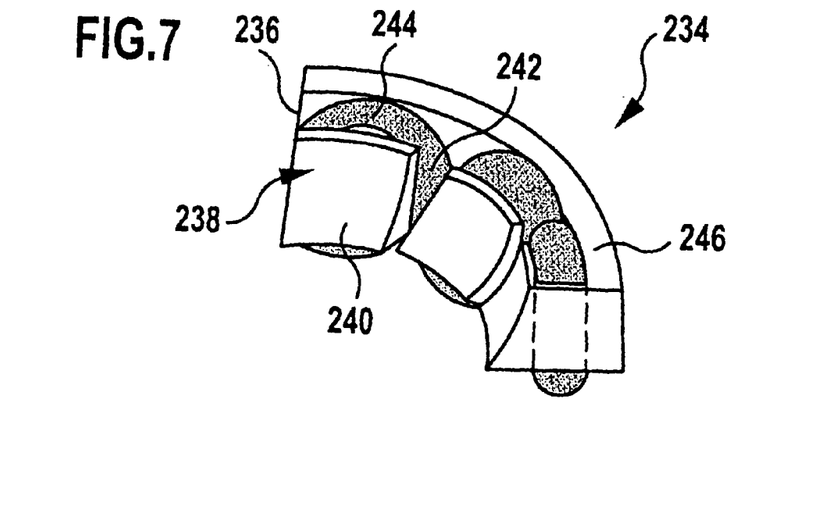
FIG. 7 shows a perspective partial view of a second embodiment of a return-path body in accordance with the invention.

In a second embodiment of a return-path body, which is designated in FIG. 7 as a whole as 234, coil receiving portions 236 are provided which are provided on respective segments 238 with spherical surface areas facing the rotor 106.

A respective recess 242 is formed between spaced segments 238 facing the rotor 106 and accommodates part of a coil 244 held by the respective coil receiving portions 236.

While in the embodiment according to FIGS. 4 to 6, the coils 211 are arranged completely in the respective recesses 210, in the embodiment illustrated in FIG. 7 only parts of the coils 244 are arranged in the recesses 242.

The coils 244 have a coil axis which is oriented substantially with respect to the return-path body 234. The corresponding coil axes are directed generally towards the rotational axis 122. The coils 244 are, therefore, wound around the segments 238 or placed on them, wherein the respective segments 238, in particular, themselves have recesses, in which the respective coils 244 are then arranged.

In this respect, it may be provided for the return-path body 234 to have a raised outer edge 246, for example, in the shape of an edge bead so that the coils 244 do not project beyond the upper area of the return-path body. This edge bead can also serve for the positioning, in particular, in a radial direction of the coils 244.

In this embodiment, as well, the coils 244 do not project into the air gap 128.

In a third embodiment of a return-path body 248 (FIG. 8), this comprises an annular area 250 which is arranged in the shape of a ring around the rotor 106 and has a plurality of segments 251 which have spherical surfaces 252 facing the rotor.

Figures 8, 9, 10, 11:
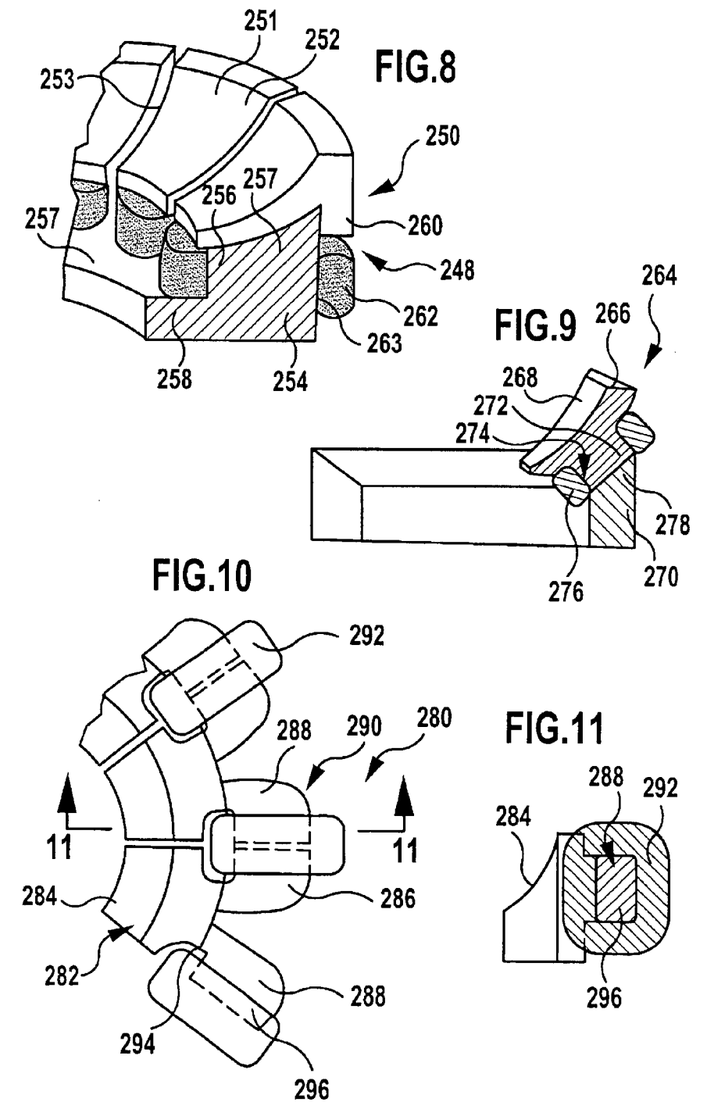
FIG. 8 shows a perspective partial sectional view of a third embodiment of a return-path body in accordance with the invention.
FIG. 9 shows a partial sectional view of a fourth embodiment of a return-path body in accordance with the invention.
FIG. 10 shows a partial plan view of a fifth embodiment of a return-path body in accordance with the invention.
FIG. 11 shows a sectional view along line 11—11 according to FIG. 10.

A gap 253 is formed between adjacent segments 251 in order to separate them magnetically.

The return-path body 248 comprises, in addition, a connecting part 254 which makes available a return-path connection between segments 251 of the annular area 250 which are located opposite one another and, in particular, located diametrically opposite one another. The connecting part 254 has, an extension transversely to the ring axis of the annular area 250. The number of connecting parts 254 corresponds preferably to half the number of segments 251. The connecting part 254 has a support area 256 in the form of a tooth 257 which supports the associated segment 206.

These teeth 257 are seated integrally on a connecting area 258 which is, for example, of a disk-like design and via which the magnetic flux can be conducted.

The support area 256 is adapted in its shape to the annular area 250 in order to make a secure support of the segments 251 on the connecting part 254 possible without essentially hindering the magnetic flux. In this respect, it may be, for example, be provided for a segment 251 to have a respective annular lip 260, with which the segment 251 can be placed over the associated tooth 257 of the support area 256.

The support area 256 is provided with recesses, in which respective coils 262 are arranged. Some of these recesses are formed by the gap 253. An additional part is formed by a recess 259 between the teeth 257 which extends radially. Coil axes of these coils 262 are oriented substantially parallel to the axis of rotation 122 and uniformly distributed over the circumference of the annular support area 256 in sectors.

The coils 262 are seated, beneath the annular area 250 with the spherical surfaces 252 and, therefore, do not project into the air gap 128.

It is provided, in particular, for a surface of the connecting area 258 facing the annular area 250 to make a contact surface available for the coils 262 (with an intermediate insulation) in order to make an easy positioning possible.

The coils 262 may be wound onto or placed on their respective coil receiving portions 263 at the support areas 256 before the segments 251 are placed on the connecting part 254 and affixed to it. As described above, an insulation is provided for the electric separation between return-path body 248 and windings of the coils 262.

In a fourth embodiment of a return-path body, which is shown in FIG. 9 and designated therein as a whole as 264, a segmented annular area 266 with substantially spherical surface areas 268 on the segments is likewise provided. A gap is located between adjacent segments. A connecting part 270 connects oppositely located segments of the annular area 266.

A flange 272, via which the segments are seated on the connecting part 270, is arranged on each of the segments of the annular area 266.

A respective coil receiving portion 274 for a coil 276 is formed by the flange 272.

The flange 272 is oriented such that it is located at an angle to the axis of rotation 122. The orientation is, in particular, such that with coils 276 in place, the coil axes pass through the sphere center point of the spherical surface 268.

The connecting part 278 has an inclined end face 278 in order to be able to accommodate the respective flanges 272.

In the case of the return-path body 264, the coils 276 are seated behind the spherical surface 268 so that a large surface area facing the rotor 106 also results in this case.

In the case of the embodiments according to FIGS. 8 and 9, the magnetic connection is brought about between individual segments below the (imaginary) sphere which forms the spherical surfaces facing the rotor.

In a fifth embodiment of a return-path body, which is shown in FIGS. 10 and 11 and designated as a whole as 280, this return-path body is composed of a plurality of separate elements 282.

A corresponding element 282 has oppositely located, outer limiting walls which are located in radial directions so that the element 282 is located between them in the form of a sector. The respective elements 282 each have a substantially spherical surface area 284 facing the rotor 106 and thus represent a segment with a spherical surface.

A first flange part 286 and a second flange part 288 are seated to the rear facing away from this spherical surface area 284, wherein the first flange part 286 cooperates with the second flange part 288 of an adjacent element and the second flange part 288 cooperates with the first flange part 286 of an element adjacent on the other side.

The two flange parts 286, 288 form on adjacent elements 282 respective coil receiving portions 290 for coils 292 which are then seated behind the spherical surfaces 284.

The respective elements 282 have, recesses 294, in which the coils 292 are at least partially arranged.

The flange parts 286 have corresponding support elements 296 which limit the respective recesses 294 in a radial direction. The coils 292 are wound onto or placed on these support elements 296 (with intermediate insulation layers), wherein the respective coil axes lie in circumferential direction or at least tangentially to the circumferential direction.

A coil 292 may be placed on a support element 296, for example, of the first flange part 286 of an element 282. An adjacent element is then connected to the element 282 and, in particular, plugged into it. As a result, the coil is also pushed onto the support element 296 of the adjacent element which is seated on its second flange part 288. The coils 292 are held, as a result, on coil receiving portions 290 which extend over two elements 282, namely adjacent elements 282. The magnetic return path is then brought about via adjacent elements 282.

The electric motor has been described on the basis of an embodiment of a synchronous rotor 106 with permanent magnets. It is also possible to use the disclosed solution for the return-path bodies in other rotor variations, such as cage rotors and hysteresis rotors.

It is likewise possible to design DC electric motors or AC electric motors with the disclosed embodiments of the return-path bodies.

Figure 12:
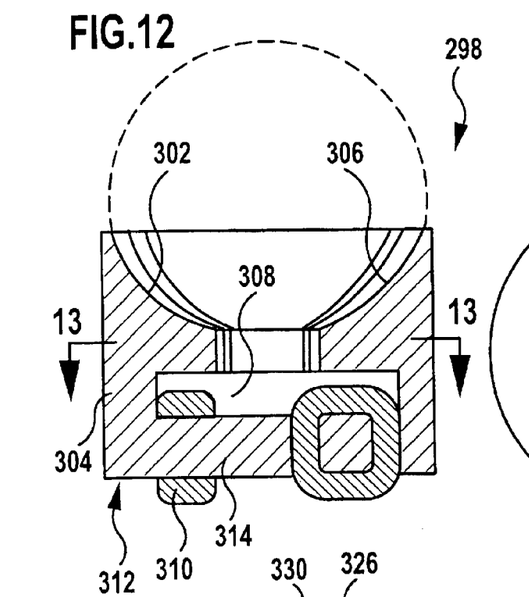
FIG. 12 shows a lateral sectional view of a sixth embodiment of a return-path body in accordance with the invention.
Figure 13:
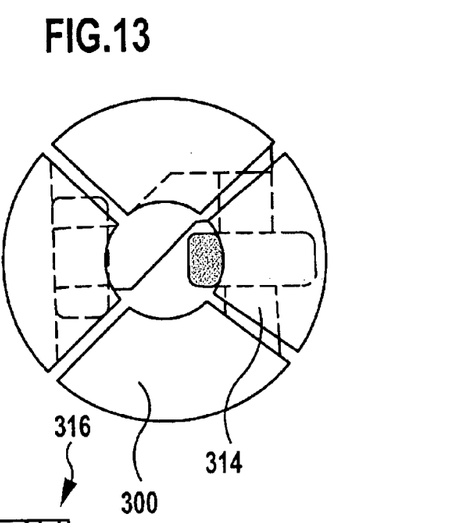
FIG. 13 shows a sectional view along line 13—13 according to FIG. 12.

In a sixth embodiment of a return-path body, which is shown in FIGS. 12 and 13 and designated therein as a whole as 298, the return-path body has a plurality of elements 300 which, when placed together, form the return-path body 298. These elements 300 have a substantially spherical surface area 302 facing the rotor. The return-path body 298 is segmented accordingly. The elements 300 have, in addition, an extension beneath this spherical area in a support area 304. This support area 304 is, therefore, arranged beneath an imaginary sphere 306 which limits the spherical surface area 302 of all the sectors 300 (e.g., forms the surface envelope of these spherical surface areas 302).

A respective recess 308 is formed in the support area 304 in order to accommodate, for example, one respective coil 320 per element 300 or two elements 300. This coil receiving portions 312 thus formed comprise a carrier 314, on which the respective coil 310 is placed or directly wound (with intermediate insulation).

With a corresponding arrangement and design of the carriers 314, it is possible for coils 310 with axes lying transversely to be positioned beneath the spherical surface area 302 of the return-path body 298.

With a corresponding adaptation of the elements to one another, the return-path body 298 may be put together from these individual elements.

Figure 14:
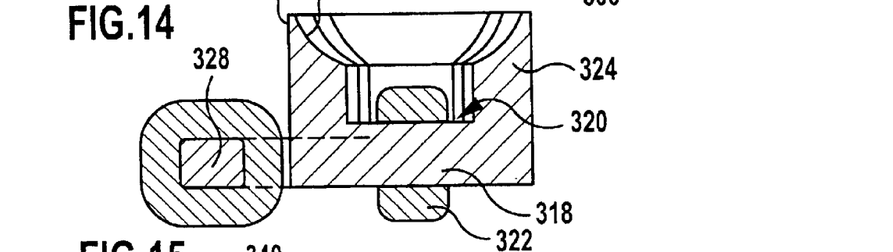
FIG. 14 shows a lateral sectional view of a seventh embodiment of a return-path body in accordance with the invention.
Figure 15:
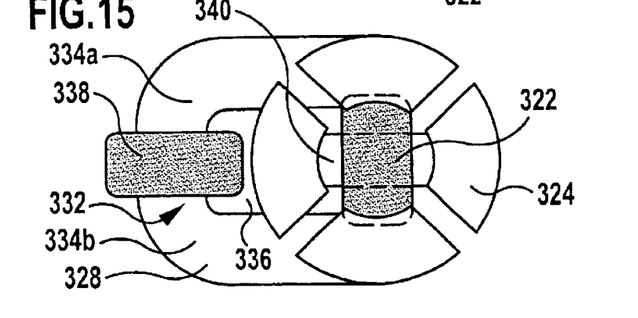
FIG. 15 shows a plan view of the return-path body according to FIG. 14.

In a seventh embodiment of a return-path body, which is shown in FIGS. 14 and 15 and designated therein as a whole as 316, this comprises a support element 318, by means of which a coil receiving portion 320 is formed. A coil 322 with a coil axis transverse to the axis of rotation of the rotor and, in particular, at substantially right angles thereto is seated on this support element 318, wherein the coil 322 is seated centrally. An axis of symmetry of the coil 322 (mirror axis), which is at right angles to the coil axis, coincides with the axis of rotation.

Return-path body segments 324, which each have a substantially spherical surface area 326, are seated on the support element 318.

For example, four segments 324 are provided, wherein two oppositely located segments are connected by the support element 318 in the manner of a web.

The two other oppositely located segments are connected via an additional support element 328, wherein this additional support element 328 projects beyond a side surface 330 of the return-path body 316. The support element 328 is, for example, of a U-shaped configuration.

A coil receiving portion 332 is likewise formed on the support element 328, wherein a recess 336 for the partial accommodation of a coil 338 is formed between oppositely located arms 334a, 334b. The coil 338 has a coil axis which lies transversely and, in particular, at substantially right angles to that of the coil 322.

The coil 338 is therefore located outside a cylindrical area which comprises the spherical surfaces 302 and beneath the sphere which is the envelope of these spherical surfaces. The coil 322 is located within the cylindrical area and beneath the envelope sphere.

The return-path body 316 has a recess 340 between the oppositely located segments 324 in order to form the coil receiving portion 320 for accommodating the coil 322. The coil 322 is seated at least partially in this recess.

Figure 16:
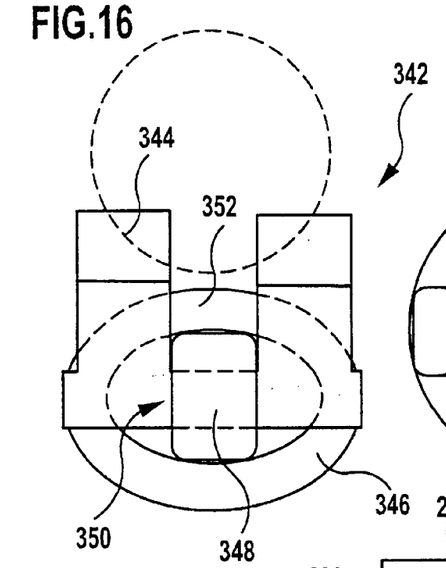
FIG. 16 shows a lateral sectional view of an eighth embodiment of a return-path body in accordance with the invention.
Figure 17:
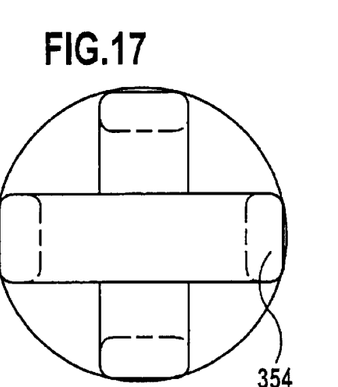
FIG. 17 shows a plan view of the return-path body according to FIG. 16.

In an eighth embodiment of a return-path body, which is shown in FIGS. 16 and 17 and designated therein as a whole as 342, a substantially spherical surface area 344 is again provided which faces the rotor.

At least one coil 346, which is oriented symmetrically with respect to an axis of rotation of the rotor, is seated beneath the spherical surface area 344. The coil axis lies transversely and, in particular, at substantially right angles to this axis of rotation. A cross section of this coil 346 extends over essentially the entire width of the return-path body 342.

This comprises, a support element 348, onto which the coil 346 is wound or placed. The support element 348 is part of a coil receiving portion 350 which also comprises a recess 352 in the return-path body 342, in which the coil 346 is partially accommodated.

Furthermore, a recess 354 is provided which extends over the width of the return-path body 342 so that the coil can also be positioned in it symmetrically to the axis of rotation over the width of the return-path body. In the case of a two-pole configuration, two coils are provided and the coil axes of the coils lie transversely and, in particular, at substantially right angles to one another.

If the return-path body is produced with a compressed powder material, many possibilities result with respect to the selection of geometry. Three-dimensional, defined shapes may, in particular, be realized. When a spherical surface 202, which faces the rotor 106, is formed at least in segments, the air gap 128 may be minimized, wherein the transferring area with respect to the magnetic flux may be configured with a sufficiently large surface area. Furthermore, the winding portion ("copper portion") on the stator 110 may be minimized since the coil receiving portion can be optimized for accommodating the windings. High degrees of efficiency then result with low material use.

It may also be provided for a return-path body 356 (FIG. 19) to be formed in one piece in a ring shape with a spherical surface area 358 which faces the rotor.

In this embodiment, several separate coils 360 are wound onto this return-path body 356 and are toroidal in shape. These coils 360 are thereby adapted to the shape of the annular return-path body 356. Their coil axis lies in circumferential direction, wherein the coil axis is curved and, generally, part of a circle. The return-path body 356 as a whole therefore forms the coil receiving portions.

A coil 360 is seated on the return-path body 356 such that its windings 362 abut on it. An outer side 364 of the return-path body 356 has a cylindrical surface. The windings 362 are guided so as to abut between this cylindrical surface and the spherical surface 358. The area of transition is formed by annular end faces 366, 368.

The windings lie, for example, at an angle to an axis of the return-path body 356 in order to make the abutment possible. The individual windings 362 can, in particular, be formed from a flat material in order to achieve a coil which follows the contour of the return-path body 356 in an optimum manner.

In the case of this embodiment, coil parts are located in the air gap 128, wherein the proportion of the entire coil portion can, however, be minimized.

While particular embodiments of the present invention have been disclosed, it is to be understood that various different modifications and combinations are possible and are contemplated within the true spirit and scope of the appended claims. There is no intention, therefore, of limitations to the exact abstract and disclosure herein presented.

What is claimed is:

1. An electric motor comprising:
   a rotor; and
   a stator;
   wherein the rotor is supported on a substantially spherical bearing and is of a substantially spherical design facing the stator;
   wherein the stator has a magnetic return-path body made of a compressed powder material; and
   wherein at least segments of the return-path body facing the rotor are of a substantially spherical design facing the rotor.
2. The electric motor according to claim 1, wherein:
   the return-path body is a compact body or comprises compact return-path body elements.
3. The electric motor according to claim 1, wherein:
   the return-path body is composed of a plurality of return-path body elements.
4. The electric motor according to claim 3, wherein:
   adjacent return-path body elements are connected via a plug connection.
5. The electric motor according to claim 1, wherein:
   the return-path body comprises a plurality of segments each having a substantially spherical surface facing the stator.
6. The electric motor according to claim 5, wherein:
   adjacent segments are magnetically separated.
7. The electric motor according to claim 5, wherein:
   a gap is provided between adjacent segments.
8. The electric motor according to claim 5, wherein:
   segments are connected to one another via a return-path area.
9. The electric motor according to claim 1, wherein:
   the return-path body surrounds the rotor in a ring shape.
10. The electric motor according to claim 1, wherein:
    the powder material comprises iron granules electrically insulated relative to one another.
11. The electric motor according to claim 1, wherein:
    the return-path body has at least one coil receiving portion.
12. The electric motor according to claim 11, wherein:
    the coil receiving portion is provided with an electric insulation and/or an accommodated coil is provided with an electric insulation towards the coil receiving portion.
13. The electric motor according to claim 11, wherein:
    the at least one coil receiving portion is arranged and designed such that accommodated coils do not project beyond a spherical area of the return-path body in the direction of the rotor.
14. The electric motor according to claim 11, wherein:
    an air gap formed between the rotor and a spherical area of the return-path body is free from coils.
15. The electric motor according to claim 11, wherein:
    the return-path body has a plurality of recesses as coil receiving portions or for the formation of coil receiving portions.
16. The electric motor according to claim 15, wherein:
    a recess having an area facing the rotor is set back in relation to the spherical surface of the return-path body.
17. The electric motor according to claim 11, wherein:
    a coil is wound onto a coil receiving portion.
18. The electric motor according to claim 11, wherein:
    a prefabricated coil is positioned on a coil receiving portion.
19. The electric motor according to claim 10, wherein:
    a coil receiving portion is dimensioned such that the part of the return-path body located in the area of the generated magnetic field of the accommodated coil is considerably smaller than the area of the return-path body transferring the generated magnetic field towards the rotor.
20. The electric motor according to claim 10, wherein:
    a coil receiving portion is dimensioned such that an adequate area of the return-path body is made available in order to transport magnetic flux below the saturation level.
21. The electric motor according to claim 10, wherein:
    a coil receiving portion is designed such that a coil with a round or approximately round cross section is adapted to be accommodated.
22. The electric motor according to claim 10, wherein:
    the return-path body has a plurality of adjacent recesses as coil receiving portions, said recesses being set back in relation to the spherical surface.
23. The electric motor according to claim 22, wherein:
    the recesses are arranged so as to be distributed uniformly around an inner circumference of the return-path body.
24. The electric motor according to claim 22, wherein:
    a coil axis of a coil seated in the coil receiving portion lies substantially in circumferential direction of the return-path body.
25. The electric motor according to claim 22, wherein:
    a coil axis of a coil seated in the coil receiving portion is aligned substantially radially.
26. The electric motor according to claim 10, wherein:
    the at least one coil receiving portion is arranged behind or beneath the spherical surface area of the return-path body facing the rotor.
27. The electric motor according to claim 26, wherein:
    the return-path body has a connecting area located transversely to an axis of rotation of the rotor and making a transverse magnetic connection available.
28. The electric motor according to claim 27, wherein:
    the at least one coil receiving portion is formed at the connecting area.
29. The electric motor according to claim 1, wherein:
    the rotor is a cage rotor.
30. The electric motor according to claim 1, wherein:
    the rotor is adapted to generate a magnetic field.
31. The electric motor according to claim 30, wherein:
    the rotor comprises a plurality of permanent magnets.
32. The electric motor according to claim 1, wherein:
    the rotor is a hysteresis rotor.
33. The electric motor according to claim 1, wherein:
    a plurality of coils are arranged on the return-path body as torus-shaped windings.
34. The electric motor according to claim 33, wherein:
    a winding axis is substantially parallel to a circumferential direction of the return-path body.
35. The electric motor according to claim 33, wherein:
    the return-path body is formed in one piece.
36. The electric motor as defined in claim 33, wherein:
    adjacent coils are electrically connected separately.

37. A circulation pump comprising:

an electric motor, comprising:
- a rotor; and
- a stator;
  - wherein the rotor is supported on a spherical bearing and is of a spherical design facing the stator;
  - wherein the stator has a magnetic return-path body made of a compressed powder material; and
  - wherein the return-path body is of a spherical design facing the rotor, at least in segments facing the rotor.

38. Circulation pump according to claim 37, wherein:

a partition wall is arranged in an air gap between rotor and return-path body.

39. Circulation pump according to claim 38, wherein:

the air gap is dimensioned such that the rotor is not essentially braked by friction in the area between partition wall and rotor.

* * * * *